(12) United States Patent
da Silva et al.

(10) Patent No.: US 9,569,730 B2
(45) Date of Patent: Feb. 14, 2017

(54) DEVICE AND METHOD FOR OPTIMALLY DISTINGUISHING AMONG AN ARBITRARY SET OF COHERENT STATES OF LIGHT

(71) Applicant: RAYTHEON BBN TECHNOLOGIES CORP., Cambridge, MA (US)

(72) Inventors: Marcus P. da Silva, Cambridge, MA (US); Saikat Guha, Everett, MA (US); Zachary Dutton, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 828 days.

(21) Appl. No.: 13/646,228

(22) Filed: Oct. 5, 2012

(65) Prior Publication Data

US 2014/0133001 A1    May 15, 2014

(51) Int. Cl.
*G06E 3/00* (2006.01)
*G06N 99/00* (2010.01)
*B82Y 10/00* (2011.01)

(52) U.S. Cl.
CPC .............. *G06N 99/002* (2013.01); *B82Y 10/00* (2013.01); *G06E 3/00* (2013.01)

(58) Field of Classification Search
CPC ....... G06N 99/00; G06N 99/002; B82Y 10/00; G03E 3/00
See application file for complete search history.

(56) References Cited

PUBLICATIONS

Oi et al, Measure Nothing, (arXiv:1207.3011v1, pp. 1-7, Jul. 13, 2012).*

Takeoka et al , Implementation of projective measurements with linear optics and continuous photon counting , (Phys. Rev. A, 71, pp. 022318-1 to 022318-10, Feb. 23, 2005).*
Blume-Kohout, et al. "Ideal State Discrimination With an $O(1)$-qubit Quantum Computer", arXiv:1201.6625v1 [quant-ph] Jan. 31, 2012 (5 pages).
Blume-Kohout, et al. "Quantum Data Gathering", Scientific Reports, vol. 3:1800, DOI: 1038/srep01800, Published May 14, 2013 (6 pages).
S. J. Dolinar, Jr., "An Optimum Receiver for the Binary Coherent State Quantum Channel," MIT Research Laboratory Quarterly Progress Report, vol. 111, Oct. 15, 1973 (cover page and pp. 115-120).
Takeoka, M.; "Projective Measurements via Linear Optics and Photon Detectors"; Single-Photon Detection and Reconstruction (Tomography) of Optical-Field States; Optics and Spectroscopy; 2007; vol. 103; No. 1; pp. 98-106.

* cited by examiner

*Primary Examiner* — Stephone B Allen
*Assistant Examiner* — Jyotsna Dabbi
(74) *Attorney, Agent, or Firm* — Lewis Roca Rothgerber Christie LLP (57) ABSTRACT

A method and device for optimal processing of a plurality of sets of coherent states of lights. The method includes: receiving a light having a coherent state; splitting the coherent state into a plurality of identical states (slices), each a coherent state with lower intensity than that of the received coherent state; transferring the information of each of the identical coherent states into a qubit; compressing the quantum information of the qubit into a quantum memory; and quantum processing the quantum information from the quantum memory.

19 Claims, 7 Drawing Sheets

DEVICE AND METHOD FOR OPTIMALLY DISTINGUISHING AMONG AN ARBITRARY SET OF COHERENT STATES OF LIGHT

STATEMENT REGARDING FEDERALLY SPONSORED RESEARCH

This invention disclosure is related to a government contract. The U.S. Government has certain rights to this invention.

FIELD OF THE INVENTION

The present invention relates to a device and method for optimally distinguishing among an arbitrary set of coherent states of light.

BACKGROUND

Quantum information is physical information that is held in the state of a quantum system. The unit of quantum information may be a qubit, a two-level quantum system. In contrast to discrete classical digital states, a two-state quantum system can be in a superposition of the two states at any given time. Unlike classical information, quantum information cannot be read without the state being disturbed by the measurement device. Furthermore, in quantum information, an arbitrary state cannot be cloned.

Coherent states of light, such as those of laser light waveforms, are widely used for communication and sensing applications, so the optimal discrimination of coherent states, that is, the quantum states of light emitted by a laser, has immense practical importance. However, quantum mechanics imposes a fundamental limit on how well different coherent states can be distinguished, even with perfect detectors, and limits such discrimination to have a finite minimum probability of error. While conventional optical detection schemes lead to error rates well above this fundamental limit, an explicit receiver design involving feedback and photon counting that can achieve the minimum probability of error has been proposed. However, this receiver design only applies to a set of two coherent states (the binary case) and the generalization of this proposed design to larger sets of coherent states has proven to be challenging, thereby suggesting that this may be a limitation inherent to proposed linear-optics-based adaptive measurement strategy.

Helstrom (cited reference [1] on page 4 of Appendix I) provided a set of necessary and sufficient conditions on the measurement that yields the minimum average probability of error in discriminating $M \geq 2$ distinct quantum states. However, for optical state discrimination, this mathematical specification of measurement operators does not usually translate into an explicit receiver specification realizable using standard optical components, thus leaving a gap between the minimum error probability (the Helstrom limit) and the minimum achievable by conventional measurements, viz., homodyne, heterodyne, and direct detection.

For discriminating two coherent states, Dolinar proposed a receiver that achieves the Helstrom limit exactly for discriminating any two coherent state signals (Cited references [2] and [12] on pages 4 and 5 of Appendix I). This proposed receiver works by applying one of two time-varying optical feedback waveforms to the laser pulse being detected, and instantaneous switching between the two feedback signals at each click event at a shot-noise-limited photon counter. More recently, it has been shown that two coherent states can be optimally distinguished using linear-optical processing followed by adaptive measurements. For discriminating between multiple (M>2) coherent states, there is yet no optical receiver known which achieves the Helstrom limit.

Figure 1:
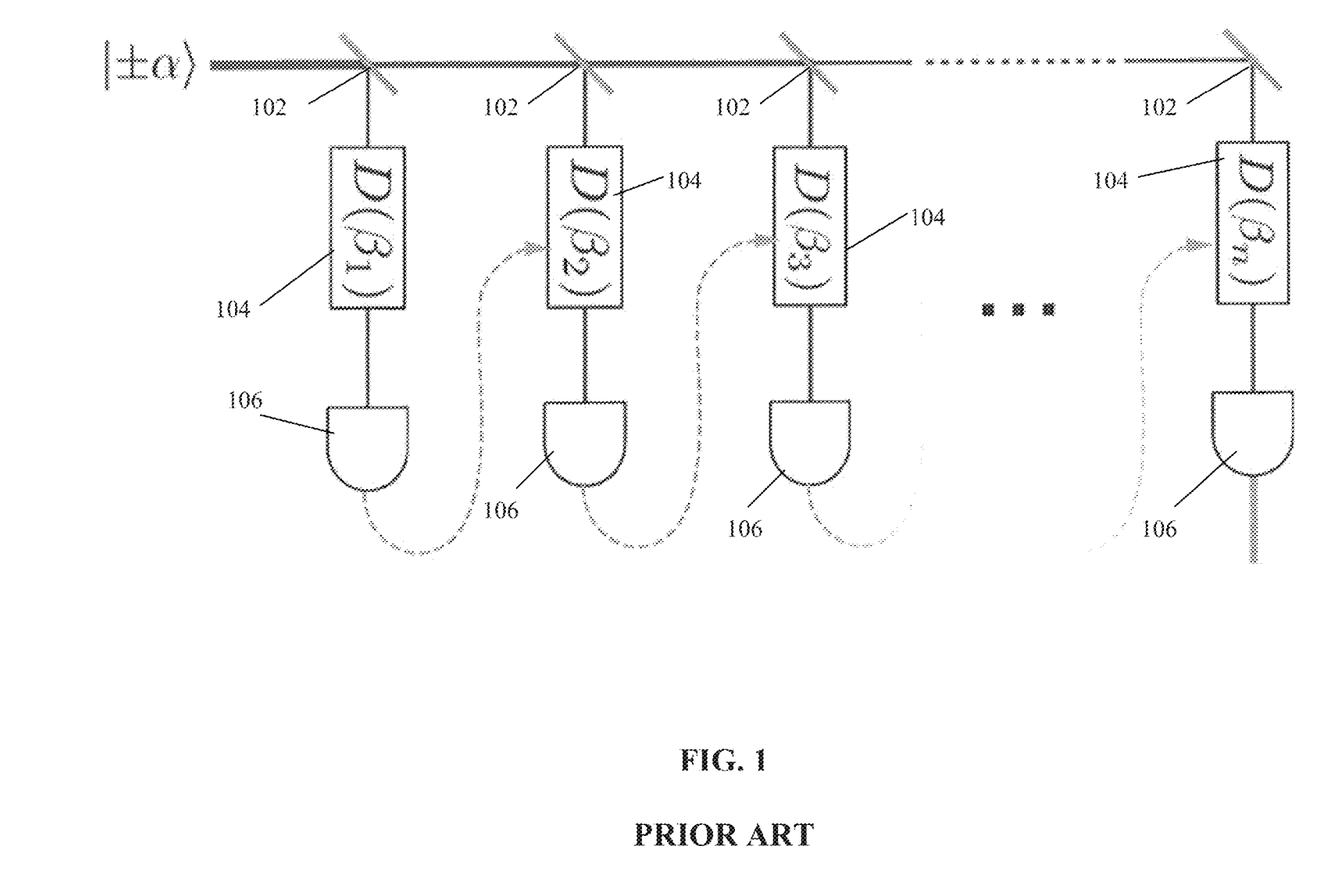
FIG. 1 is a block diagram of a receiver for a binary case, according to prior art.

A number of sub-optimal receivers for the M>2 case have been proposed with a common philosophy—that of "slicing" a coherent-state pulse into smaller coherent-states, detecting each slice via photon counting after coherent addition of a local field, and feeding forward the detection outcome to the processing of the next slice, as illustrated in FIG. 1. The Dolinar receiver functions by slicing the coherent state, but instead of compressing all the information content of the slices, it measures each slice individually and feeds information about the measurement forward to the measurement of the other slices. After the final measurement, this receiver is able to determine which state was transmitted with a minimum probability of error allowed by quantum mechanics. The main disadvantages of the Dolinar receiver are that: 1) it can only optimally distinguish between two coherent states, 2) it only optimizes the probability of error and cannot be easily adapted to optimize a different figure of merit, and 3) it results in a classical decision, not quantum states, accordingly, its results cannot be further optimally processed by a quantum device/computer. That is, making a classical decision corresponds to making a measurement, which destroys some information which could be useful for additional quantum processing. Thus, making a classical decision is akin to not fully utilizing the information that is in the quantum states, and thus additional processing after a classical decision may be suboptimal.

A quantum computer makes direct use of quantum mechanical properties, such as superposition and entanglement, to perform operations on data. Contrary to digital computers, which require data to be encoded into binary digits (bits), quantum computers utilize quantum properties to represent data and perform operations on these data. Quantum computers share theoretical similarities with non-deterministic and probabilistic computers, like the ability to be in more than one state simultaneously. A quantum computer maintains a sequence of "qubits," each of which can represent a one, a zero, or any quantum superposition of these two qubit states. Additionally, a pair of qubits can be in any quantum superposition of 4 states, and three qubits in any superposition of 8.

In general, a quantum computer with n qubits can be in an arbitrary superposition of up to $2^n$ different states simultaneously (contrasting to a classical computer that can only be in one of these $2^n$ states at any one time). A quantum computer operates by setting the qubits in a controlled initial state that represents the hypothesis at hand and by manipulating those qubits with a fixed sequence of quantum logic gates. The calculation may end with measurement of all the states, collapsing each qubit into one of the two pure states, so the outcome can be at most n classical bits of information. Alternatively, the qubits may be stored in a quantum memory for further quantum processing.

Recent research shows that any optical receiver involving the most general coherent-state feedback, passive linear optics and photon counting cannot attain the quantum-limited channel capacity of an optical channel to carry classical information. The fact that such generalizations of Dolinar's optimal binary receiver to larger sets of coherent states has proven to be challenging, and the above result on the limitation of general coherent optical receivers, suggest that this may be a limitation inherent to the linear-opticsbased adaptive measurement approach, and that the binary discrimination case is somehow special.

SUMMARY OF THE INVENTION

The present invention alleviates these problems in such a manner that 1) it can optimally distinguish between any number of coherent states by customizing the compression operations, 2) the compression operations are independent of what measurement is to be performed or what additional processing is to be done on the state, so that the quantum output may be used to optimize any desired figure of merit, and 3) the quantum output is the quantum state of the memory of a quantum computer, so it can be processed by a quantum computer/device in any desired manner.

The present invention provides the flexibility of handling any number or set of coherent states, and the ability to obtain a quantum state at the output that can be further optimally processed by other quantum devices, thus allowing for example, a receiver to be reused as a component for quantum communication and quantum sensing.

In some embodiments, the method and device of the present invention split the state of the coherent light into a collection of identical states (slices) with much lower intensity (i.e., the number of photons). The invention then compresses the information content of the slices into the memory of a quantum computer for further quantum processing. The compression may be performed serially, that is, one slice at a time, or in parallel. With a sufficient number of slices (or equivalently, with sufficiently faint slices), the quantum state of the slice is very well approximated by the state of a quantum bit (qubit or q-bit). Once the slices have been compressed, one can perform the measurement that optimizes any quantity of interest, or output the quantum state for additional quantum processing. For example, the probability of making an error in distinguishing between the possible states, or the mutual information between the transmitted symbol and the received symbol, can be optimized using the method or the device of the present invention.

In some embodiments, the present invention is a method for optimal processing of a plurality of sets of coherent states of lights. The method includes: receiving a light having a coherent state; splitting the coherent state into a plurality of identical states (slices), each a coherent state with lower intensity than the received coherent state; transferring the information of each of the identical states into a qubit; compressing the quantum information of the qubit into a quantum memory; and quantum processing the quantum information from the quantum memory.

In some embodiments, the present invention is an optimal unitary receiver for optimal processing of a plurality of sets of coherent states of lights. The receiver includes: a light capturing device for receiving a light having a coherent state; a network of passive linear-optical elements for splitting the coherent state into a plurality of identical states, each a coherent state with lower intensity than that of the received coherent state; a transducer for transferring the information of each of the identical coherent states into a qubit; and a quantum information processor for compressing the quantum information of the qubit into a quantum memory, and for quantum processing the quantum information from the quantum memory.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention is directed to a method and device that optimally distinguishes between any states in a set of coherent state, such as a laser light.

In some embodiments, the present invention is a method and device that optimally distinguish between any states in a set of coherent states (e.g., laser waveforms). The invention splits the state into a large collection of identical states ("slices") with much lower intensity (i.e., number of photons) and then compresses the information content of these slices, one slice at a time, into the memory of a quantum computer. With a sufficiently high number of slices (equivalently, with sufficiently faint slices), the quantum state of the slice is very well approximated by the state of a "q-bit" (quantum bit), and the optimal compression operations for the information in a discrete set of q-bit states with many copies (in this case, the slices of the coherent states) has been described by other authors elsewhere (see attached publications). Once the slices have been compressed, one can perform the measurement that optimizes any quantity of interest (e.g., the probability of making an error in distinguishing between the possible states, or the mutual information between the transmitted symbol and the received symbol), or one can perform additional quantum processing of the compressed state.

The present invention leverages the result about the optimal discrimination of multi-copy quantum hypotheses to achieve optimal discrimination of any set of coherent states of a coherent light. Furthermore, the method and device of the present invention are reusable and composable. As illustrative examples, the performance of discriminating states of a ternary alphabet is analyzed. Furthermore, how a receiver for a binary alphabet can be reused in discriminating between multimode hypotheses is demonstrated. Additionally, the present invention is directly applicable to achieving the quantum limit on the rate of classical information transmission on a lossy optical channel, which is known to exceed the Shannon rate of any conventional optical receiver.

The present invention allows, for example, a receiver to be reused as a component for quantum communication and quantum sensing. That is, if a string of 0/1s that composes a classical codeword is received, the optimal receiver to distinguishing between the different codewords needs the entire received states to make the optimal decision. With a binary receiver that compressed each bit individually and then outputs a compressed quantum states, the output quantum states for the bits can then be further compressed into a small quantum memory that represents just the different codewords. Thus, instead of building a full receiver that is customized to the code, the compression receiver according to the present invention may be utilized to receive each transmitted bit first, then process the compressed memory outputs in a way that is tailored to the code. Changing the code just requires changing the second stage of the receiver.

FIG. 1 is a block diagram of a receiver for a binary case, according to prior art. However, this receiver is suboptimal when it is used for a set with M>2 coherent states. Possible coherent states $|\pm\alpha\rangle$ are input to a plurality of beamsplitters 102 and then input to n D($\beta$n) blocks (104) to operate on the slices. Every "D" block represents a phase-space displacement operation, which shifts the amplitude and phase of the coherent states by a constant amount.

The outputs of the blocks 104 are then fed to photon detectors 106 in a chained manner to produce the final output. As explained above, it is possible to distinguish between two coherent states optimally by slicing the input state and measuring each slice adaptively—the outcome of each photon detection measurement (dashed arrows) being used to perform a displacement on the input of the next measurement. Once the final slice is measured, the final outcome is used to make a decision about which hypothesis was more likely to have been received.

Figure 2:
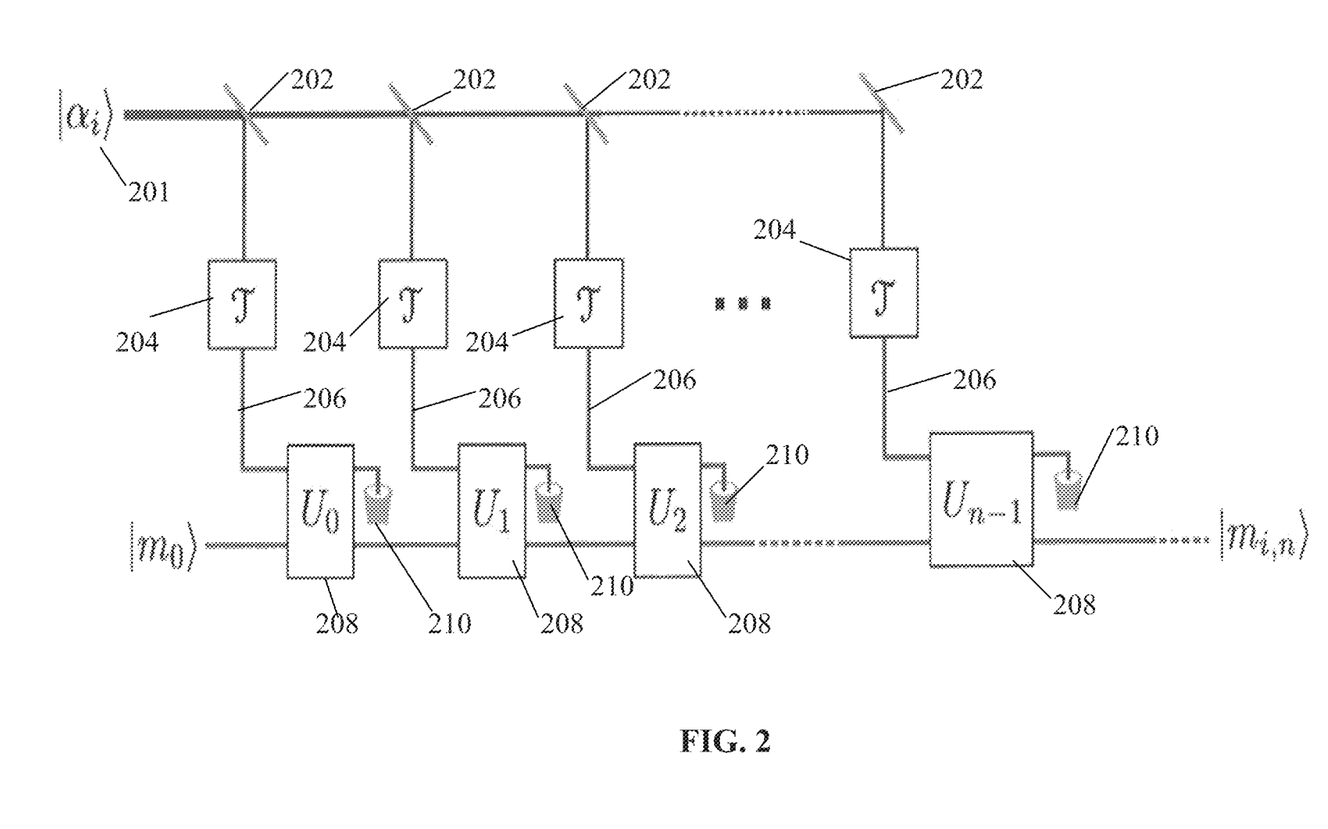
FIG. 2 is a block diagram of an optimal receiver, according to some embodiments of the present invention.

FIG. 2 is a block diagram of an optimal receiver, according to some embodiments of the present invention. As shown, possible coherent states $|\alpha_i\rangle$ are input to a plurality of (beam) splitters 202 to split the states to a plurality of smaller identical states. Although, (beam) splitters are used as an example to split the coherent state into smaller states, any other types of "splitting" device, such as a hologram may be used for this operation. Furthermore, the splitting may be performed in time or in space, in which a slice is displaced, measured and then the measurement information is used to decide the operation of the next slice. In both manners, the coherent state remains a coherent state when split into identical states of smaller amplitude and same phase. This way, the optimal binary or ternary discrimination operates on small slices, each with an average of less than one photon. Appendix I includes the theoretical background and basis for the splitting, transferring to qubits, and compressing the information content of the slices, the entire contents of which is herein expressly incorporated by reference.

A transformation ($\tau$) is then performed on each coherent slice by the transfer blocks 204 to transfer the slices into qubits 206. The information in these qubits can then be efficiently and coherently compressed by the unitaries $U_k$ into a quantum memory (m), so that the final state $|m_{i,n}\rangle$ of the memory can then be measured or processed further, for example, as part of a multimode receiver. Each unitary function (performed, for example, by a quantum information processor) places the information of the qubits 206 into the qubit from memory ($|m_0\rangle$) and disregards the qubit (210).

Here, instead of measuring each slice adaptively, one can transfer ($\tau$) each coherent slice into qubits 206 by the transfer blocks 204. This unitary compression receiver can be customized to any set of coherent state hypotheses, and its design is independent of the figure of metric being optimized, as all information about the received state is compressed into the final memory state. In this example, the slices are generated serially, one slice at a time by the a network of passive linear-optical elements 202, such as beam splitters and compressed serially. However, the slicing (and the compression) may be done is parallel. The unitaries $U_k$ 208 are defined by Equation 23 for a set of 2 coherent states and Equation 30 for a set of 3 coherent states, in Appendix I. Also, in Equation 25, the "−1" may be replaced by a hypothesis index, e.g., "i" and U would have to satisfy such a constraint for all "i" in the set of coherent states. The state $|h_i\rangle$ is the qubit state that results from the transfer of a slice into a qubit.

Figure 3:
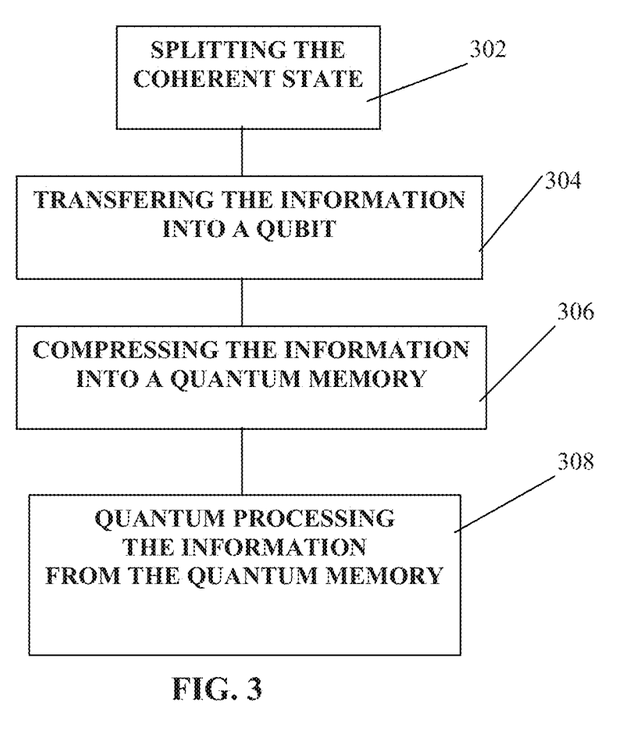
FIG. 3 is an exemplary process flow diagram illustrating a method, executed on one or more processors, for optimal processing of arbitrary set of coherent lights, according to some embodiments of the present invention.

FIG. 3 is an exemplary process flow diagram illustrating a method, executed on one or more processors, for optimal processing of arbitrary set of coherent lights, according to some embodiments of the present invention. When the light is received, for example, by a light capturing device, a coherent state, for example, from a laser waveform, is split into a plurality of identical coherent states, each with an intensity much lower than the intensity of the original coherent state, by a network of passive linear-optical elements, as shown in block 302. In some embodiments, the invention keep slitting the coherent state into the smaller states until the average intensity for each smaller state is less than one photon. This makes the transferring the states into qubits substantially more accurate. In other words, if there are more than one photon in a state, the state cannot be well described by a qubit state, and the transfer would be much more noisy. The splitting may be performed in time or in space, in which a slice is displaced, measured and then the measurement information is used to decide the operation of the next slice. An exemplary splitting operation is defined by Equation 1 in Appendix I.

In block 304, for each identical coherent state (slice), the information content of the slice is transferred to a qubit, for example, by a transducer. An exemplary transfer operation is defined by Equations 14 and 18, in Appendix I. That is, Equation 18 describes the effect of the stimulated Raman adiabatic passage (STIRAP) operation. In some embodiments, transferring operation comprises exchanging the quantum state of light with the state of a qubit, such that the final state of the qubit contains all information about the initial state of the light.

In block 306, the information content of the qubits are then compressed into a quantum memory for example, by a quantum information processor. An exemplary compression operation is defined by Equations 23 and 30, in Appendix I. In some embodiments, the compression operation comprises mapping all information on two qubits to a state of only one of the two qubits. The compression operation may be performed by any device controlling the set of qubits, for example, a quantum information processor or a quantum computer. The content of the quantum memory can then be further optimally processed by a quantum computer, or measured by a measuring device, for example, a bank of detectors.

Figure 4:
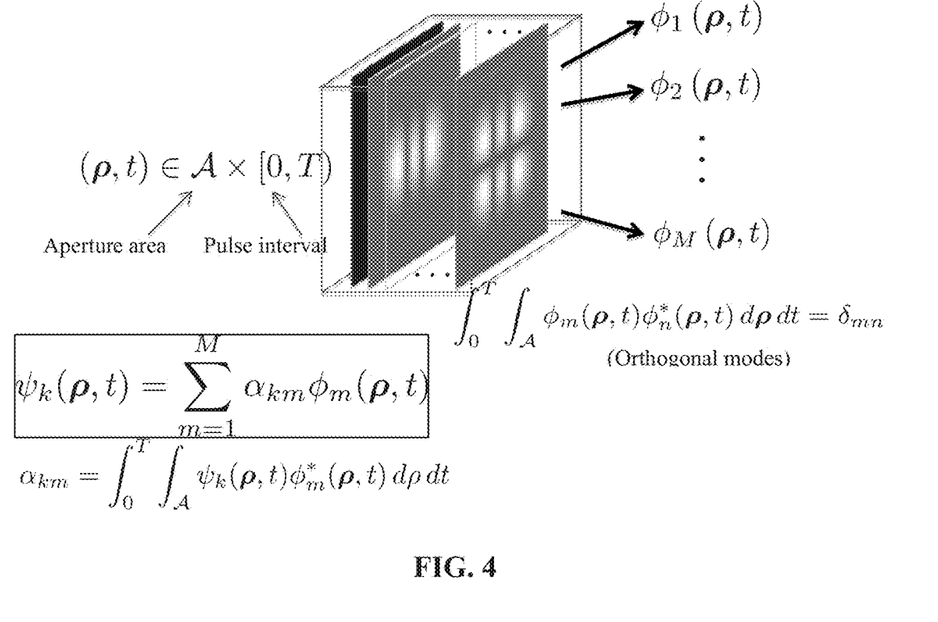
FIG. 4 is a diagram depicting the theory behind a spatio-temporal mode transformation, according to some embodiments of the present invention.

FIG. 4 is a diagram depicting the theory behind a spatio-temporal mode transformation, according to some embodiments of the present invention. As shown, for a general task-specific imaging problem having quasi-monochromatic coherent state waveforms with a pulse interval T, and Aperture area A. As shown, a coherent state of light can be spread across multiple orthogonal modes (in both space and time). Even in this multimode case, the state can be converted (through linear optics, which may include, e.g., a network of passive linear-optical elements, beam splitters, or holograms) into a coherent state of a single mode. In essence, FIG. 4 depicts that the multimode case can be handled as easily as the single mode case.

Figure 5:
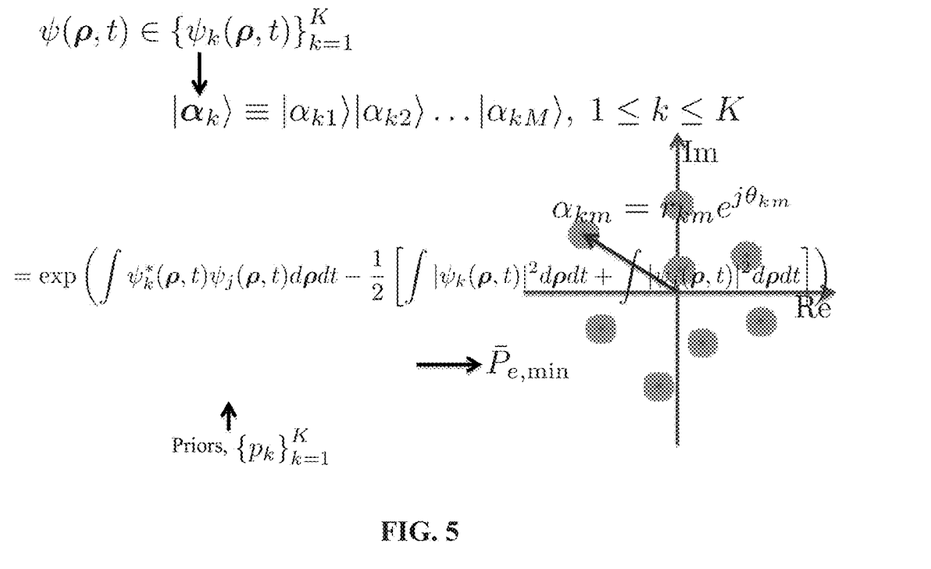
FIG. 5 is a diagram illustrating coherent states of multiple modes, according to some embodiments of the present invention.

FIG. 5 is a diagram illustrating the coherent states of multiple modes, according to some embodiments of the present invention. The K candidate waveforms (the multimode states before being sliced) are the product of constant amplitude and constant phase coherent states in each of M orthogonal modes. That is, the phase and amplitude of the coherent state in each mode may be different for any given hypothesis. As shown, the present invention applies to multimode hypotheses as well as single mode hypotheses. The image that is superposed with the equations is a graphical representation of coherent states in a single optical mode. Each fuzzy block corresponds to a different coherent states, which in this representation can be thought of as a probability distribution of two variables (one corresponding to the electric field amplitude, the other to the magnetic field amplitude). In summary, FIG. 5 described the states and the prior probability distribution with which they are transmitted to the receiver.

Figure 6:
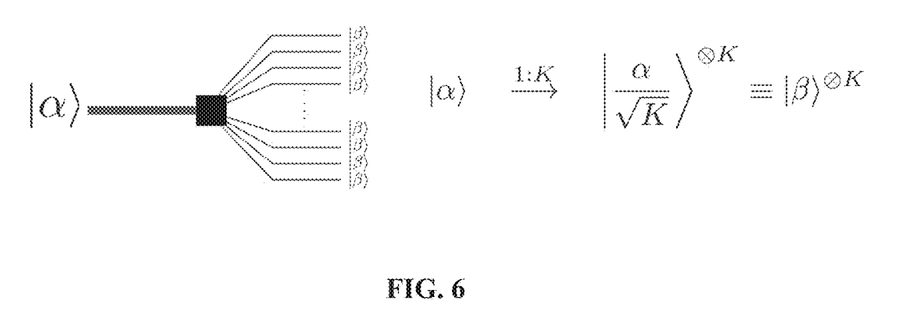
FIG. 6 is an exemplary diagram showing the slicing of the coherent state with amplitude alpha into K coherent states each with amplitude beta=alpha/sqrt(K), according to some embodiments of the present invention.

FIG. 6 is an exemplary diagram showing the slicing of the coherent state with amplitude alpha into K coherent states each with amplitude beta=alpha/sqrt(K), according to some embodiments of the present invention. The low amplitude coherent states (slices) are approximately the qubit states:

$$|\beta\rangle = e^{-\frac{|\beta|^2}{2}} \sum_n \frac{\beta^n}{\sqrt{n!}} |n\rangle \underset{\beta \ll 1}{\approx} \frac{|0\rangle + \beta|1\rangle}{\sqrt{1+|\beta|^2}}$$

That is, any coherent state, for example coherent light waveform of a laser, can be mapped into K low-amplitude coherent states by a 1:K balanced beam splitter (or a network of passive linear-optical elements), as shown in FIG. 6. In other words, the state of each slice is, to a good approximation, well represented by a qubit state. These states can be treated as optical (e.g., single-rail) qubits, and the state of each of the qubits can be transferred to an atomic qubit via stimulated Raman adiabatic passage (STIRAP) pulses.

$$\sum_{n=0}^{\infty} c_n |n\rangle |0\rangle \xrightarrow{STIRAP} \sum_{n=1}^{\infty} c_n |n-1\rangle |1\rangle + c_0 |0\rangle |0\rangle \xrightarrow{tr_{ij}}$$

$$\underbrace{\left(\sum_{n=1}^{\infty} |c_n|^2\right) |1\rangle\langle 1| + |c_0|^2 |0\rangle\langle 0| + c_1 c_0^* |1\rangle\langle 0| + c_0 c_1^* |0\rangle\langle 1|}_{error}$$

Accordingly, the problem of distinguishing between N different states $|\alpha_i\rangle$ gets mapped to the problem of distinguishing between N qubit states using K copies. This problem has a know solution using a $\lceil \log_2 N \rceil + 1$ qubits (QC) to compress sufficient statistics one copy at a time.

The present invention may be used to improved optical communications in low-photon regimes. For example, the invention may be used in deep space communication (e.g., between a distant satellite and earth), or in applications (e.g., military) to minimize the likelihood that an adversary or hacker would detect that information being optically communicated and thereby increase the security of certain optical communications.

Figure 7:
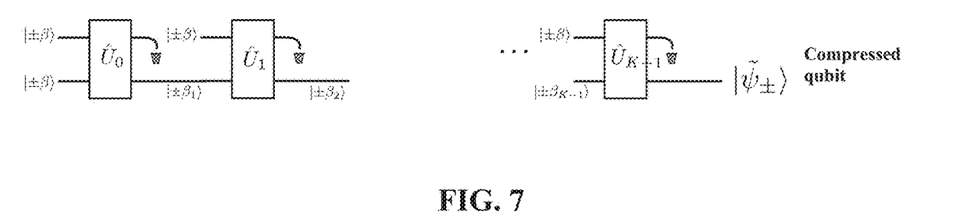
FIG. 7 is an exemplary block diagram of a composable BPSK receiver, according to some embodiments of the present invention.

FIG. 7 is an exemplary block diagram of a composable binary phase shifting keying (BPSK) receiver, according to some embodiments of the present invention. The receiver is capable of receiving laser waveform, process them and store the quantum states in a quantum memory for further optimal quantum processing. Such quantum processing may correspond to the measurement of the state, or it may involve the interaction with other memory states corresponding, e.g., to other bits in the same codeword, and which may be amenable to additional compression. Here, as explained above, the information necessary to distinguish between $|+\alpha\rangle$ and $|-\alpha\rangle$ can be obtained through the compression of the slices $|\pm\beta\rangle$ by the unitary gates $U_i$. That is, the two hypotheses $|\pm\beta\rangle|\pm\beta\rangle$ span a 2D subspace that can be unitarily compressed into a single qubit by $U_0$ resulting in states $|\pm\beta_1\rangle$. Similarly, the hypotheses $|\pm\beta_1\rangle|\pm\beta\rangle$ span a 2D subspace that can be unitarily compressed by $U_1$ to the states $|\pm\beta_2\rangle$, and so on. The compressed qubit output represents all of the states (slices), in this case.

For the BPSK receiver, taking $|\pm\beta\rangle =$ $$|\pm\beta\rangle = \frac{|0\rangle \pm \beta|1\rangle}{\sqrt{1+|\beta|^2}}$$

allows one to compute Ui analytically as:

$$\hat{U}_i = \hat{U}_i(\beta_i, \beta)$$

$$B_{(i)} = \sqrt{1 + \frac{2}{(-1)^i \left(\frac{\beta^2+1}{\beta^2-1}\right)^{i+1} - 1}}$$

$$\beta_0 = \beta$$

$$U_{i>0} = \begin{bmatrix} \frac{1}{\sqrt{1+\beta^2 B_{(i)}^2}} & 0 & 0 & \frac{\beta B_{(i)}}{\sqrt{1+\beta^2 B_{(i)}^2}} \\ 0 & \frac{B_{(i)}}{\sqrt{\beta^2+B_{(i)}^2}} & \frac{\beta}{\sqrt{\beta^2+B_{(i)}^2}} & 0 \\ 0 & \frac{\beta}{\sqrt{\beta^2+B_{(i)}^2}} & \frac{B_{(i)}}{\sqrt{\beta^2+B_{(i)}^2}} & 0 \\ \frac{\beta B_{(i)}}{\sqrt{1+\beta^2 B_{(i)}^2}} & 0 & 0 & -\frac{1}{\sqrt{1+\beta^2 B_{(i)}^2}} \end{bmatrix}$$

In practice, the truncation to the $|0\rangle/|1\rangle$ subspace leads to all input states to be disturbed, but in the limit of $\beta \to 0$, the analysis is exact. That is, instead of having the qubits in a pure superposition of 0 and 1, they will be in some noisy superposition of 0 and 1 (a mixed stated which is not pure). The compression unitaries are designed for these pure states, which although not identical to the states of the qubits, approximate the state of the qubit very well. In the limit of $K \to \infty$ these states are indistinguishable. In other words, the expression should be $\langle m_{j,k} | \rho_{j,k} | m_{j,k} \rangle \to 1$ as $K \to \infty$, where $|m_{j,k}\rangle$ are pure qubit memory states.

The receiver of the present invention may be implemented by capturing the optical states in a cavity which then interacts with a qubit realized as a solid state, trapped ion, or a cold atom cloud in order to transfer the state to the qubit. The state of light can be transferred to a qubit via STIRAP, and the operations to implement the compression may then be performed directly on the solid state, ion trap, or cold atom-based quantum computer. The operations to implement the compression may then be performed directly on the solid state, ion trap, or cold atom-based quantum computer.

Figure 8:
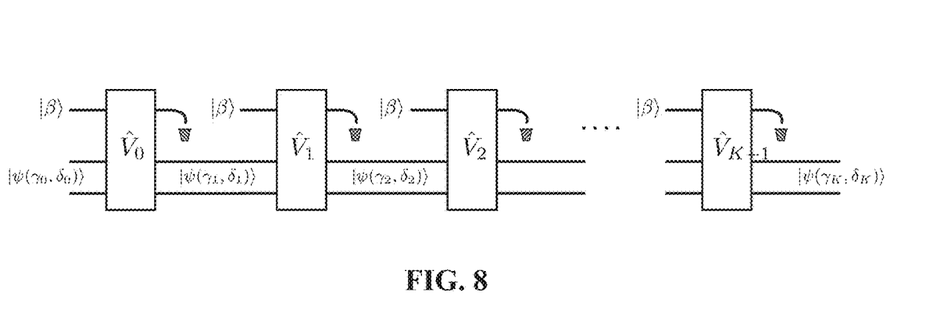
FIG. 8 is an exemplary block diagram of a composable ternary receiver, according to some embodiments of the present invention.

FIG. 8 is an exemplary block diagram of a composable ternary receiver, according to some embodiments of the present invention. In this case, although the same general structure and process as the BPSK receiver of FIG. 7 may be used, $\lceil \log_2 3 \rceil = 2$ memory qubits are needed. Similar to the BPSK, the compressed qubit output represents all of the states (slices). Here, the ideal memory state is defined as:

$$|\psi(\gamma_i, \delta_i)\rangle = \frac{1}{\sqrt{1+|\gamma_i|^2+|\delta_i|^2}}(|00\rangle + \gamma_i|01\rangle + \delta_i|11\rangle)$$

where $\gamma_i$ has phase information but $\delta_i$ does not (just amplitude information).

$$C_{(t)} = \sqrt{\frac{(1+\beta^2)^t - (1-\beta^2)^t}{2}}$$

$$D_{(t)} = \sqrt{\frac{(1+\beta^2)^t + (1-\beta^2)^t}{2} - 1}$$

$$C_0 = 0$$

$$D_0 = 0$$

$$V_{t>0} = \begin{bmatrix} 1 & 0 & 0 & 0 & 0 & 0 & 0 & 0 \\ 0 & \frac{C_{(t)}}{\sqrt{\beta^2 + C_{(t)}^2 + \beta^2 D_{(t)}^2}} & 0 & 0 & \frac{\beta}{\sqrt{\beta^2 + C_{(t)}^2 + \beta^2 D_{(t)}^2}} & 0 & 0 & \frac{\beta D_{(t)}}{\sqrt{\beta^2 + C_{(t)}^2 + \beta^2 D_{(t)}^2}} \\ 0 & * & * & * & * & * & * & * \\ 0 & 0 & \frac{D_{(t)}}{\sqrt{D_{(t)}^2 + \beta^2 C_{(t)}^2}} & 0 & \frac{\beta C_{(t)}}{\sqrt{D_{(t)}^2 + \beta^2 C_{(t)}^2}} & 0 & 0 & 0 \\ 0 & * & * & * & * & * & * & * \\ 0 & * & * & * & * & * & * & * \\ 0 & * & * & * & * & * & * & * \\ 0 & * & * & * & * & * & * & * \end{bmatrix}$$

where gamma_i and delta_i are parameters describing the compressed qubit memory at step "i", and V_i is the compression unitary for the ternary case. The asterisks mark free parameters in the compression unitary.

Figure 9:
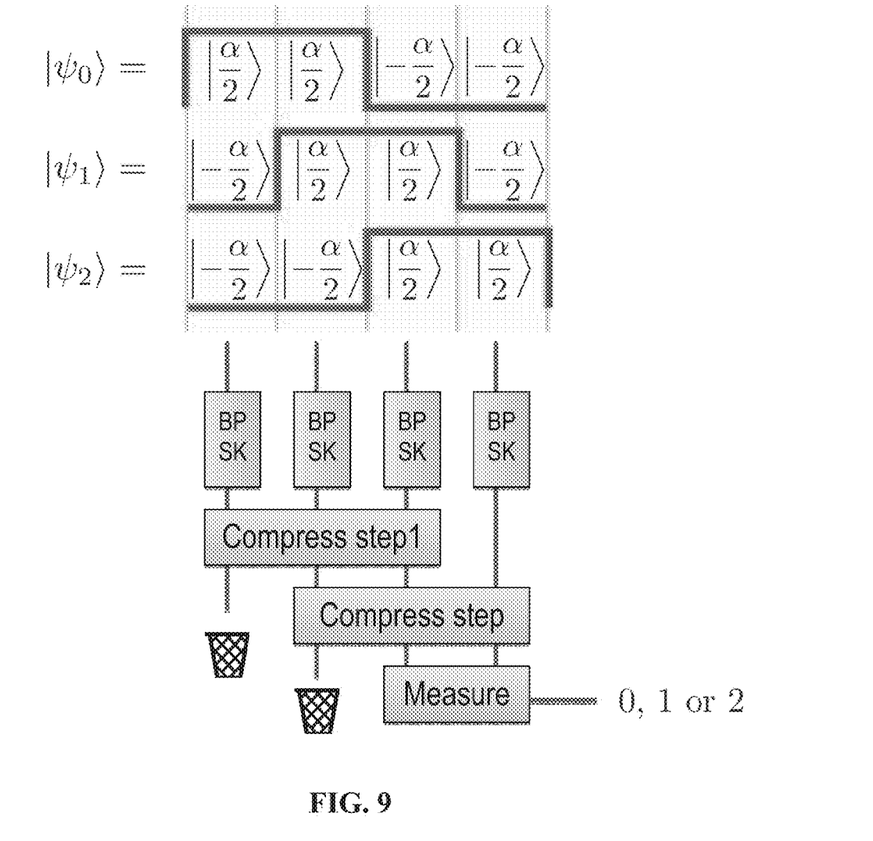
FIG. 9 is an exemplary block diagram of a ranging receiver, according to some embodiments of the present invention.

FIG. 9 is an exemplary block diagram of a ranging receiver, according to some embodiments of the present invention. As an example, the simplified scenario of distinguishing between flat-top ranging waveforms that overlap are considered. The light is received by a light receiving device and split in to a plurality by a beam splitter. In some embodiments, a transducer transfers the information of each of the identical coherent states into a qubit; and a quantum information processor or compresses the quantum information of the qubit into a quantum memory. At each time slot, there are BPSK symbols, which can be coherently compressed into a qubit using the composable BPSK receiver, described above, for example, by a quantum information processor. The BPSK receiver design is independent of choice of measurement. Any of the following parameters may be optimized:
- probability of error
- root mean squared error of estimate
- mutual information.

Additionally, matrix elements of compression steps for any set of waveforms can be easily computed, using the known methods. Gate decomposition requires more effort (e.g. Solovay-Kitaev algorithm), however, number of gates is provably polynomial in the number of hypotheses. The three quantum states described comprise of 4 well-separate temporal modes, each of which can have a coherent state with amplitude alpha/2 or −alpha/2. In practice, it can be any two coherent states, as any two coherent states can easily be converted into two states of this form. Each temporal mode is processed separately by the optimal compression receiver of the present invention for BPSK, resulting in a 4 distinct single qubit quantum memory states.

Since it is known that the transmitted state is one of the 3 hypotheses, these states can be compressed further into a 2 qubit state in the same manner that the individual slices of the optimal receiver are compressed, as additional quantum processing that is made possible by the receiver generating a quantum state instead of a classical decision. The fact that additional processing can be performed on the output of the BPSK receiver is called "composability," that is, the ability to compose the optimal receiver operation with other operations). The fact the BPSK receiver can be used as a component to build other optimal receivers is called "reusability". Once the compressed state with all the information corresponding to the receiver state are obtained, one can, for example, measure and decide which state was received (with minimum probability of error).

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for optimal processing of a plurality of sets of coherent states of lights, the method comprising:
   receiving a light having a first coherent state out of a known set of 3 or more different coherent states;
   splitting the first coherent state of the received light into a plurality of slices of identical states, each of the plurality of slices of identical states being a coherent state of infinite dimensions with lower intensity than that of the first coherent state;
   transferring information of each of the plurality of slices of identical coherent states into a plurality of qubits, respectively;
   compressing quantum information of the plurality of qubits respectively including information of each of the plurality of slices of identical coherent states of infinite dimensions, into a quantum memory; and
   quantum processing the compressed quantum information from the quantum memory.

2. The method of claim 1, wherein said splitting is performed in time domain.

3. The method of claim 1, wherein said splitting is performed in space domain.

4. The method of claim 1, wherein said splitting comprises displacing a slice of the plurality of slices of identical coherent states, measuring the displaced slice and using measurement information to decide an operation for a next slice.

5. The method of claim 1, wherein said splitting comprises splitting the coherent state into smaller states until an average intensity for each smaller state is less than one photon on average.

6. The method of claim 1, wherein said transferring comprises exchanging a quantum state of the light of each of the plurality of slices of identical coherent states with a state of a respective qubit, such that a final state of the respective qubit contains all information about an initial state of the light of each of the plurality of slices, respectively.

7. The method of claim 1, wherein said compressing is performed serially, one slice at a time.

8. The method of claim 1, wherein said compressing is performed in parallel on all slices.

9. The method of claim 1, wherein said compressing comprises mapping all information on two qubits to a state of only one of the two qubits.

10. An optimal unitary receiver for optimal processing of a plurality of sets of coherent states of lights comprising:
    a light capturing device for receiving a light having a first coherent state out of a known set of 3 or more different coherent states;
    a network of passive linear-optical elements for splitting the first coherent state of the received light into a plurality of slices of identical states of infinite dimensions, each a coherent state with lower intensity than that of the first coherent state;
    a transducer for transferring information of each of the plurality of slices of identical coherent states into a plurality of qubits, respectively; and
    a quantum information processor for compressing quantum information of the plurality of qubits respectively including information of each of the plurality of slices of identical coherent states of infinite dimensions into a quantum memory, and for quantum processing the compressed quantum information from the quantum memory.

11. The optimal unitary receiver of claim 10, further comprising a bank of detectors to measure the compressed qubits stored in the quantum memory.

12. The optimal unitary receiver of claim 10, wherein said splitting is performed in time domain.

13. The optimal unitary receiver of claim 10, wherein said splitting is performed in space domain.

14. The optimal unitary receiver of claim 10, wherein said splitting comprises displacing a slice of the plurality of slices of identical coherent states, measuring the displaced slice and using measurement information to decide an operation for a next slice.

15. The optimal unitary receiver of claim 10, wherein said splitting comprises splitting the coherent state into smaller states until an average intensity for each smaller state is less than one photon on average.

16. The optimal unitary receiver of claim 10, wherein said transducer is configured to exchange a quantum state of the light of each of the plurality of slices of identical coherent states with a state of a respective qubit, such that a final state of the respective qubit contains all information about an initial state of the light of each of the plurality of slices, respectively.

17. The optimal unitary receiver of claim 10, wherein said quantum information processor performs the compressing serially, one slice at a time.

18. The optimal unitary receiver of claim 10, wherein said quantum information processor performs the compressing in parallel on all slices.

19. The optimal unitary receiver of claim 10, wherein said quantum information processor maps all information on two qubits to a state of only one of the two qubits to compress quantum information of said two qubits.

* * * * *